(12) United States Patent  
Durand et al.

(10) Patent No.: US 9,026,423 B2  
(45) Date of Patent: *May 5, 2015

(54) FAULT SUPPORT IN AN EMULATION ENVIRONMENT

(71) Applicant: Mentor Graphics Corporation, Wilsonville, OR (US)

(72) Inventors: Eric Durand, La Ville du Bois (FR); Estelle Reymond, Orsay (FR); John Fadel, Les Ulis (FR)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,235

(22) Filed: Dec. 26, 2013

(65) Prior Publication Data

US 2014/0108865 A1   Apr. 17, 2014

Related U.S. Application Data

(63) Continuation of application No. 13/924,810, filed on Jun. 24, 2013, now Pat. No. 8,645,118, which is a continuation of application No. 13/185,263, filed on Jul. 18, 2011, now Pat. No. 8,473,273, which is a continuation of application No. 11/971,125, filed on Jan. 8, 2008, now Pat. No. 7,983,893.

(51) Int. Cl.

| | | |
|---|---|---|
| G06F 9/455 | (2006.01) | |
| G06F 11/07 | (2006.01) | |
| G06F 11/26 | (2006.01) | |

(52) U.S. Cl.  
CPC .......... *G06F 11/0703* (2013.01); *G06F 11/261* (2013.01); *G06F 9/455* (2013.01); *G06F 11/0766* (2013.01)

(58) Field of Classification Search  
CPC ............ G06F 11/0703; G06F 11/0766; G06F 11/261; G06F 9/455  
USPC .................. 703/23–24, 28; 716/116  
See application file for complete search history.

(56) References Cited

U.S. PATENT DOCUMENTS 5,835,930 A * 11/1998 Dobbek ........................... 711/4  
5,838,948 A    11/1998 Bunza  
(Continued)

FOREIGN PATENT DOCUMENTS

| | | |
|---|---|---|
| EP | 0 935 195 | 8/1999 |
| WO | WO 01/95238 | 12/2001 |

OTHER PUBLICATIONS

International Search Report and Written Opinion for PCT/EP2006/060335, filed Feb. 28, 2006.

(Continued)

*Primary Examiner* — Eunhee Kim  
(74) *Attorney, Agent, or Firm* — Klarquist Sparkman, LLP

(57) ABSTRACT

An emulator is disclosed that allows for diagnoses of failures or defects within the emulator. A map of faulty resources is generated to identify which resources should be avoided during compilation. Thus, in a transparent and automated manner, defects found during diagnostics are stored in a database of unusable emulator resources. A compiler has access to the database and compiles the design taking into account unusable resources. In another embodiment, the defects of an emulator board are stored on the emulator board itself. This allows each board to store its own maintenance information that can be used at the manufacturing site for changing defective chips. Defects stored on the board itself allow the defects to be obtained independent of a position of a board within the emulator to simplify identification of the faulty resource.

18 Claims, 10 Drawing Sheets

(56) References Cited

U.S. PATENT DOCUMENTS

| | | | |
|---|---|---|---|
| 5,838,949 | A | 11/1998 | Hassoun |
| 5,903,744 | A | 5/1999 | Tseng et al. |
| 5,946,471 | A | 8/1999 | Voorhees et al. |
| 5,963,735 | A | 10/1999 | Sample et al. |
| 6,009,256 | A | 12/1999 | Tseng et al. |
| 6,026,230 | A | 2/2000 | Lin et al. |
| 6,134,516 | A | 10/2000 | Wang et al. |
| 6,230,119 | B1 | 5/2001 | Mitchell |
| 6,266,721 | B1 | 7/2001 | Sheikh et al. |
| 6,332,201 | B1 | 12/2001 | Chin et al. |
| 6,445,969 | B1 | 9/2002 | Kenney et al. |
| 6,539,535 | B2 | 3/2003 | Butts et al. |
| 6,665,706 | B2 | 12/2003 | Kenner et al. |
| 6,691,251 | B2 | 2/2004 | Wong |
| 6,698,012 | B1 | 2/2004 | Kossatchev et al. |
| 6,704,895 | B1 | 3/2004 | Swoboda et al. |
| 6,721,922 | B1 | 4/2004 | Walters et al. |
| 6,732,068 | B2 | 5/2004 | Sample et al. |
| 6,839,013 | B1 | 1/2005 | Cummins et al. |
| 7,089,170 | B2 | 8/2006 | Buckmaster et al. |
| 7,171,347 | B2 | 1/2007 | Khaira et al. |
| 7,337,104 | B2 | 2/2008 | Engel et al. |
| 7,440,886 | B2 | 10/2008 | Bress et al. |
| 7,475,288 | B2 | 1/2009 | Multhaup et al. |
| 7,480,609 | B1 | 1/2009 | Cavanagh et al. |
| 7,546,571 | B2 | 6/2009 | Mankin et al. |
| 7,567,894 | B2 | 7/2009 | Durand et al. |
| 7,577,558 | B2 * | 8/2009 | Birguer ............ 703/23 |
| 7,848,914 | B2 | 12/2010 | Durand et al. |
| 2001/0020251 | A1 | 9/2001 | Sheikh et al. |
| 2002/0108094 | A1 | 8/2002 | Scurry |
| 2002/0170030 | A1 | 11/2002 | Halcomb et al. |
| 2003/0069724 | A1 | 4/2003 | Schubert et al. |
| 2003/0074177 | A1 | 4/2003 | Bowen |
| 2003/0074178 | A1 | 4/2003 | Sample et al. |
| 2003/0115506 | A1 | 6/2003 | Edwards et al. |
| 2004/0025165 | A1 | 2/2004 | Desoli et al. |
| 2005/0193251 | A1 | 9/2005 | Chuang et al. |
| 2005/0268195 | A1 | 12/2005 | Lund et al. |
| 2006/0059387 | A1 | 3/2006 | Swoboda et al. |
| 2006/0130013 | A1 | 6/2006 | Penzias et al. |
| 2007/0113209 | A1 | 5/2007 | Park et al. |
| 2007/0203687 | A1 | 8/2007 | Durand et al. |
| 2007/0226541 | A1 | 9/2007 | Brunot et al. |
| 2008/0016396 | A1 | 1/2008 | Higashi et al. |
| 2009/0106604 | A1 | 4/2009 | Lange et al. |
| 2009/0177459 | A1 | 7/2009 | Durand et al. |
| 2009/0182544 | A1 | 7/2009 | Durand et al. |
| 2009/0216514 | A1 | 8/2009 | Durand et al. |
| 2009/0240457 | A1 | 9/2009 | Durand et al. |
| 2009/0248390 | A1 | 10/2009 | Durand et al. |
| 2009/0299723 | A1 | 12/2009 | Durand et al. |

OTHER PUBLICATIONS

Izumi et al., Proposal of the Web-Based Training System for the Experiment of the Digital Circuit, The 27th Annual Conference of the IEEE Industrial Electronics Society, 2001, pp. 1766-1770.

Kumar (Prototyping the M68060 for Concurrent Verification, IEEE 1997).

Liu et al., A New Method of TOE Architecture Bassed on the ML403 Development Board in Linux, First International Multi-Symposiums on Computer and Computational Sciences, 2006, pp. 160-166.

Sun et al., Using MATLAB as a Semi-Automated Circuit Emulator with Symbolic Capabilities, pp. 253-258, IEEE 2000.

Zuver et al., Internet-Based Tool for System-On-Chip Project Testing and Grading, IEEE International Conference on Microelectronic Systems Education, 2003, pp. 119-120.

* cited by examiner

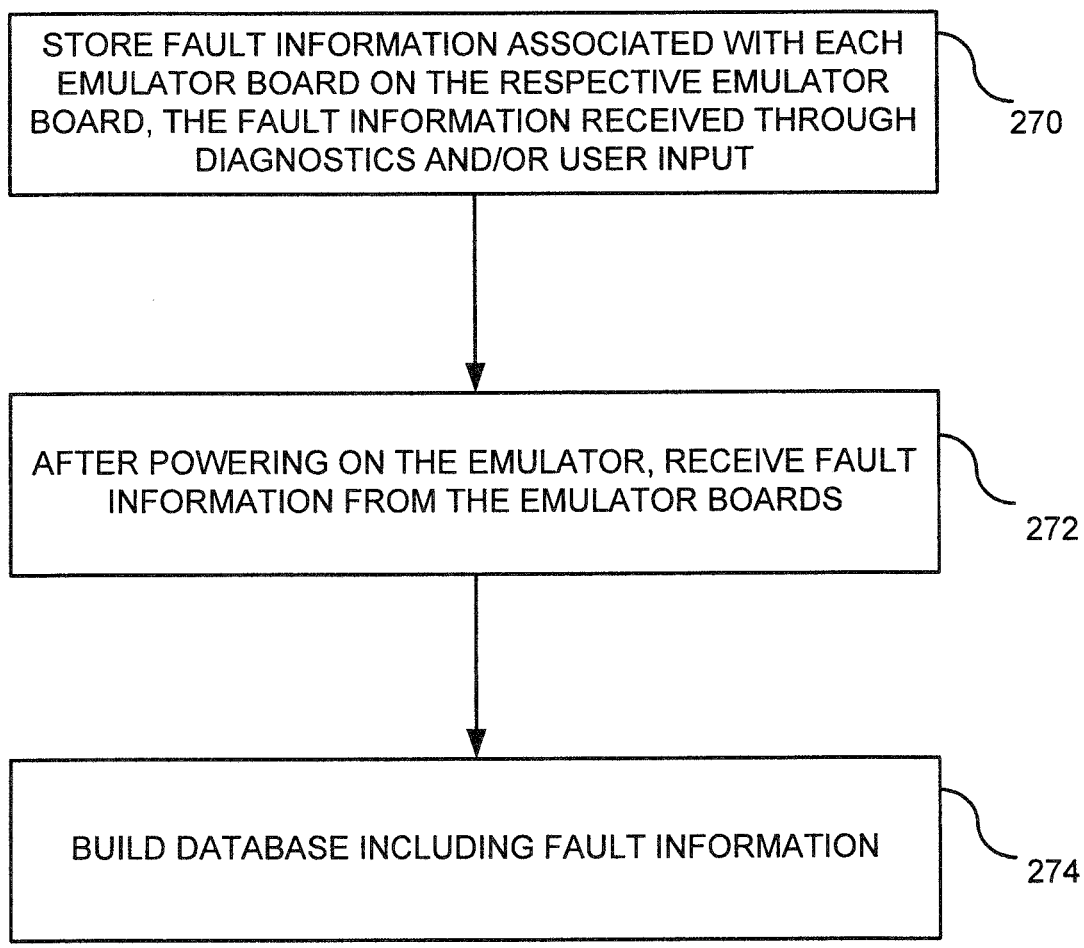

FAULT SUPPORT IN AN EMULATION ENVIRONMENT

CROSS REFERENCE TO RELATED APPLICATIONS

This is a continuation of U.S. patent application Ser. No. 13/924,810, filed Jun. 24, 2013, (now U.S. Pat. No. 8,645,118, issued Feb. 4, 2014), which is a continuation of U.S. patent application Ser. No. 13/185,263, filed Jul. 18, 2011 (now U.S. Pat. No. 8,473,273, issued Jun. 25, 2013), which is a continuation of U.S. patent application Ser. No. 11/971,125, filed Jan. 8, 2008 (now U.S. Pat. No. 7,983,893, issued Jul. 19, 2011), all applications of which are hereby incorporated herein by reference.

FIELD

The present disclosure generally relates to hardware emulators, and more particularly to monitoring faults in a hardware emulator.

BACKGROUND

Today's sophisticated SoC (System on Chip) designs are rapidly evolving and nearly doubling in size with each generation. Indeed, complex designs have nearly exceeded 50 million gates. This complexity, combined with the use of devices in industrial and mission-critical products, has made complete design verification an essential element in the semiconductor development cycle. Ultimately, this means that every chip designer, system integrator, and application software developer must focus on design verification.

Hardware emulation provides an effective way to increase verification productivity, speed up time-to-market, and deliver greater confidence in the final SoC product. Even though individual intellectual property blocks may be exhaustively verified, previously undetected problems can appear when the blocks are integrated within the system. Comprehensive system-level verification, as provided by hardware emulation, can test overall system functionality, IP subsystem integrity, specification errors, block-to-block interfaces, boundary cases, and asynchronous clock domain crossings. Although design reuse, intellectual property, and high-performance tools all help by shortening SoC design time, they do not diminish the system verification bottleneck, which can consume 60-70% of the design cycle. As a result, designers can implement a number of system verification strategies in a complementary methodology including software simulation, simulation acceleration, hardware emulation, and rapid prototyping. But, for system-level verification, hardware emulation remains a favorable choice due to superior performance, visibility, flexibility, and accuracy.

A short history of hardware emulation is useful for understanding the emulation environment. Initially, software programs would read a circuit design file and simulate the electrical performance of the circuit very slowly. To speed up the process, special computers were designed to run simulations as fast as possible. IBM's Yorktown "simulator" was the earliest (1982) successful example of this as it used multiple processors running in parallel to run the simulation. Each processor was programmed to mimic a logical operation of the circuit for each cycle and could be reprogrammed in subsequent cycles to mimic a different logical operation. This hardware 'simulator' was faster than the current software simulators, but far slower than the end-product ICs. When Field Programmable Gate Arrays (FPGAs) became available in the mid-80's, circuit designers conceived of networking hundreds of FPGAs together in order to map their circuit design onto the FPGAs and the entire FPGA network would mimic, or emulate, the entire circuit. In the early 90's the term "emulation" was used to distinguish reprogrammable hardware that took the form of the design under test (DUT) versus a general purpose computer (or work station) running a software simulation program.

Soon, variations appeared. Custom FPGAs were designed for hardware emulation that included on-chip memory (for DUT memory as well as for debugging), special routing for outputting internal signals, and for efficient networking between logic elements. Another variation used custom IC chips with networked single bit processors (so-called processor based emulation) that processed in parallel and usually assumed a different logic function every cycle.

Physically, a hardware emulator resembles a large server. Racks of large printed circuit boards are connected by backplanes in ways that most facilitate a particular network configuration. A workstation connects to the hardware emulator for control, input, and output. Before the emulator can emulate a DUT, the DUT design must be compiled. That is, the DUT's logic must be converted (synthesized) into code that can program the hardware emulator's logic elements (whether they be processors or FPGAs). Also, the DUT's interconnections must be synthesized into a suitable network that can be programmed into the hardware emulator. The compilation is highly emulator specific and can be time consuming. After the compilation is complete, the design is downloaded into the emulator.

Some integrated circuits in the emulator can be faulty or become faulty over time (i.e., malfunctioning or defective), which can lead to an unacceptable emulation of a downloaded design. Correction through re-compilation is time consuming and wasteful.

SUMMARY

An emulator is disclosed that allows for diagnoses of failures or defects within the emulator. A map of faulty resources can be generated to identify which resources should be avoided during compilation. Thus, desirably in a transparent and automated manner, emulator defects found during diagnostics can be stored in a database or in formatted output files. A compiler has access to the database or formatted output files and can compile the design taking into account (e.g., avoiding the use of) defective or unusable resources.

In another embodiment, the defects of an emulator board can be stored on the emulator board itself. This allows each board to store its own maintenance information that can be used, for example, at the manufacturing site for changing defective chips. Defects stored on the board itself allow the defects to be obtained independent of the position of a board within the emulator to simplify identification of the faulty resource.

In another embodiment, the emulator can check the current state of faulty resources on an emulator board and compare the faults to a compiled design to be downloaded. If the compiled design uses faulty resources an error condition can be indicated.

In another embodiment, a unique database is created when powering on the emulator, built from fault information received from the emulator boards. When new faults are detected during diagnostics or input by a user, such faults are sent to the appropriate emulator boards containing those faults for being stored onboard in non-volatile memory.

The foregoing features and advantages of embodiments will become more apparent from the following detailed description, which proceeds with reference to the accompanying figures.

BRIEF DESCRIPTION OF THE DRAWINGS

FIG. 10 is a flowchart of an embodiment of a method for storing fault information on an emulator board.

DETAILED DESCRIPTION

Disclosed below are representative embodiments of electronic circuit testing techniques and associated apparatus that should not be construed as limiting in any way. Instead, the present disclosure is directed toward all novel and nonobvious features and aspects of the various disclosed methods, apparatus, and equivalents thereof, alone and in various combinations and subcombinations with one another. The disclosed technology is not limited to any specific aspect or feature, or combination thereof, nor do the disclosed methods and apparatus require that any one or more specific advantages be present or problems be solved.

As used in this application and in the claims, the singular forms "a," "an" and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements.

Although the operations of some of the disclosed methods and apparatus are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods and apparatus can be used in conjunction with other methods and apparatus.

Any of the methods described herein can be performed (at least in part) using software comprising computer-executable instructions stored on one or more computer-readable media. Furthermore, any intermediate or final results of the disclosed methods can be stored on one or more computer-readable media. For example, a software tool can be used to determine and store one or more control signals used to control any of the disclosed apparatus. Any such software can be executed on a single computer or on a networked computer (for example, via the Internet, a wide-area network, a local-area network, a client-server network, or other such network). For clarity, only certain selected aspects of the software-based implementations are described. Other details that are well known in the art are omitted. For the same reason, computer hardware is not described in further detail. It should be understood that the disclosed technology is not limited to any specific computer language, program, or computer. For instance, a wide variety of commercially available computer languages, programs, and computers can be used.

Figure 1:
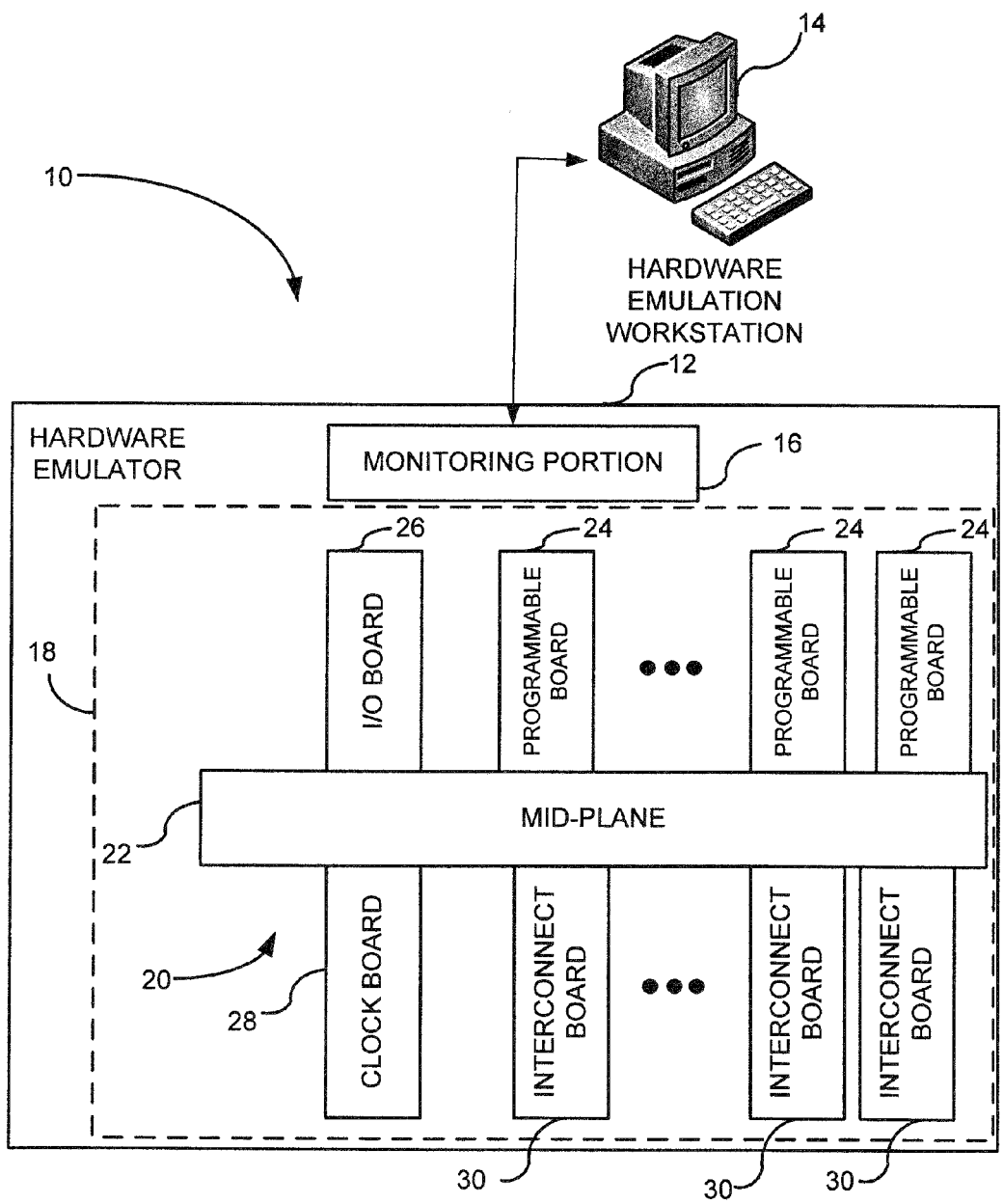
FIG. 1 is a system diagram of an exemplary hardware emulator environment.

FIG. 1 shows an exemplary emulator environment 10 including a hardware emulator 12 coupled to one or more hardware emulator hosts 14. The emulator host 14 may be any desired type of computer hardware and generally includes a user interface through which a user can load, compile and download a design to the emulator 12. Additionally, the user can visualize physical parameters associated with the emulator through a graphical user interface (GUI) on any of the emulator hosts 14, as further described below. The illustrated emulator 12 includes a monitoring portion 16 and an emulation portion 18. The emulation portion 18 includes multiple printed circuit boards 20 coupled to a midplane 22. The midplane 22 allows physical connection of the printed circuit boards into the emulator 12, in this example, on both sides of the midplane. A backplane may also be used in place of the midplane, the backplane allowing connection of printed circuit boards on one side of the backplane. Any desired type of printed circuit boards may be used. For example, programmable boards 24 generally include an array of FPGAs, VLSIs or ICs, or other programmable circuitry, that may be programmed with the user's design downloaded from the emulator host 14. One or more I/O board interfaces 26 can allow communication between the emulator 12 and hardware external to the emulator. For example, the user may have a preexisting processor board that is used in conjunction with the emulator and such a processor board connects to the emulator through I/O board interface 26. Clock board 28 can generate any number of desired clock signals. Interconnect boards 30 can allow integrated circuits on the programmable boards 24 to communicate together and with integrated circuits on the I/O board interface 26.

Figure 2:
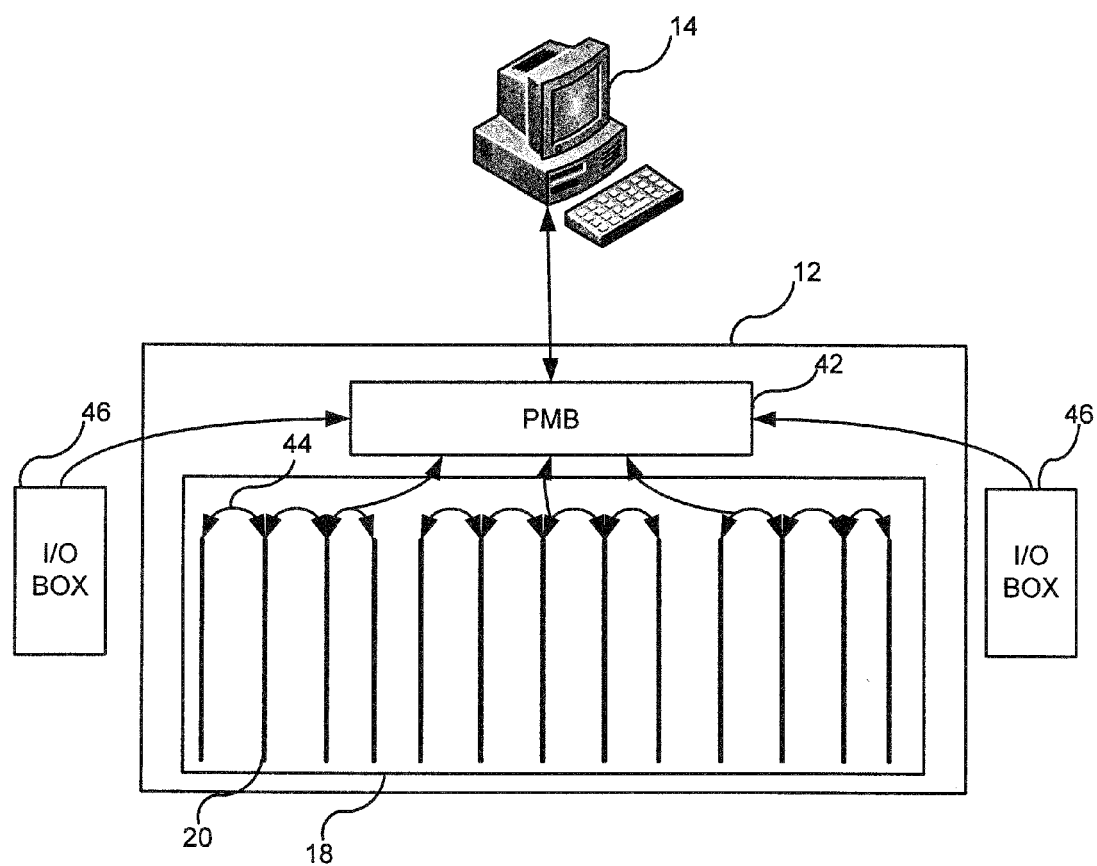
FIG. 2 is a more detailed system diagram for an exemplary system comprising multiple host computers coupled to the emulator through an intermediate platform maintenance board.

FIG. 2 shows a more detailed view of an exemplary system. The multiple host computers 14 are coupled together through a network 40, such as a LAN, but other networks can also be used. The host computers 14 can be equipped with a high-speed-link PCI board coupled to a platform maintenance board (PMB) 42, which acts as an exemplary of the monitoring portion 16. The PMB 42 can monitor various physical parameters in the emulator portion 18 and can create the interface between the emulator portion 18 and the host computers 14. The PMB 42 on a periodic basis (e.g., 10 seconds) transmits communication and monitoring reports to the host workstations 14 for display in the GUI. Similarly, the PMB 42 may receive information regarding the physical parameters of the emulator portion 18, such as periodically. For example, hardware (e.g., an FPGA) on each printed circuit board 20 typically has intelligence for monitoring physical parameters on its respective board and for sending this physical information to the PMB (e.g., every 5 seconds). Other changes, such as a detected error, can be transmitted immediately upon and in response to the detection. Thus, the PMB 42 may instantaneously (as opposed to periodically) detect any changes in the emulation environment 10 and generate real-time state change messages to the host stations 14. All of the physical parameters obtained through the PMB desirably can be obtained while the emulator portion 18 is performing emulation. Thus, several emulations may be separately running and the physical parameters of the emulator may separately be viewed on the GUI of the host computers. However, there need not be a link between the number of simultaneous emulations and the number of workstations. For example, several emulations can be simultaneously run through one workstation. The printed circuit boards 20 can be grouped in a one-to-one correspondence with the number of host computers. This grouping allows one host computer to be associated with a group of boards 20 so that multiple high-speed links can be used in parallel. The grouping used can be easily be modified based on the design or not used at all. For example, all boards can be chained together into one group that correspond with one host computer. IO boxes 46 can allow the connection of other user boards to the system. The IO boxes 46 can also be coupled to the PMB 42 and monitored thereby.

Figure 3:
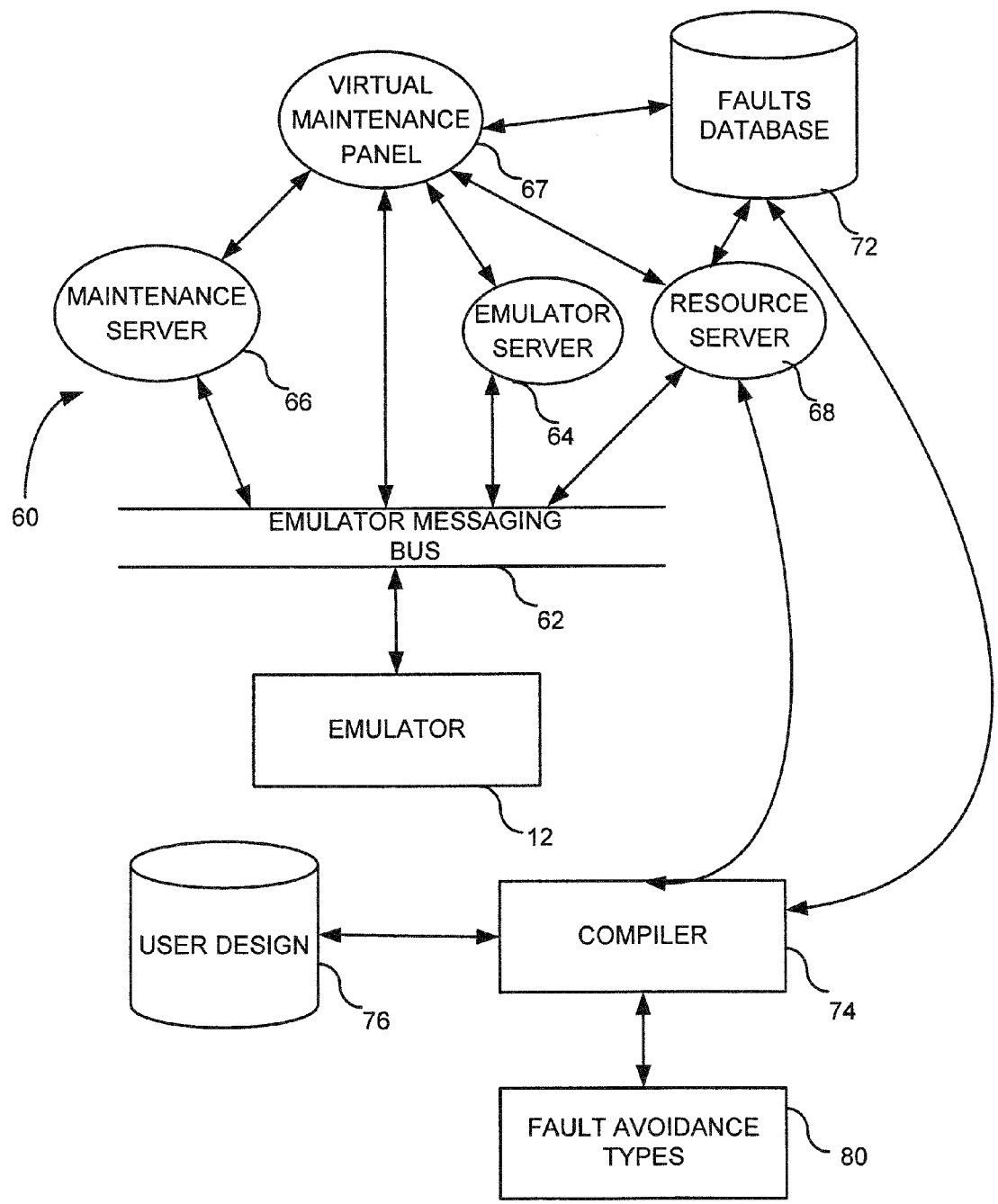
FIG. 3 is an exemplary high-level system diagram showing various servers connected through a messaging bus.

FIG. 3 shows a view of a form of the emulator system including various servers 60 that communicate through a messaging bus 62. Emulator server 64 can be in charge of managing one physical host connection to the emulator and provide a way to transfer data between the emulator messaging bus 62 and the emulator 12. If there is more than one emulator, then additional servers 64, 66, 68 can be used for each emulator. The maintenance server 66 can be in charge of diagnostics, and storing maintenance information collected from other applications, servers, and/or emulator boards. The resource server 68 can be in charge of managing the different emulator resources provided to the applications. The virtual maintenance panel (VMP) 67, in this example, is the main user interface through which the user can control the system, monitor and control the emulators. The virtual maintenance panel can also be coupled to a faults database 72 that stores information about components (e.g., integrated circuits) on printed circuit boards (e.g., programmable boards 20) in the emulator 18 that are not properly functioning. Thus, the faults may be stored externally to an emulator board. A compiler 74 can be coupled to a database 76 containing the user's design to be emulated. The compiler 74 is also desirably coupled to the resource server 68 and the faults database 72 (or the compiler may read fault files generated by the virtual maintenance panel instead of the database 72). When compiling the design from database 76, the compiler can access either the faults database 72, the resource server 68 or both in order to obtain a list of components (e.g., integrated circuits) that are malfunctioning and should not be used. The compiler 74 may also obtain defective IC information from the maintenance server 66 instead of the resource server by coupling the compiler to the maintenance server. In addition, the compiler 74 may receive user input regarding fault avoidance 80. The fault avoidance options can allow a user to control what resources or components the compiler considers accessible. For example, under one fault avoidance option that can be called "flat", there is a direct one-to-one correspondence between components that are faulty and the components that the compiler avoids using. For example, if IC0 is the only IC not working on PCB0, then only IC0 on PCB0 is not used. In a second option that can be called "generic slot", if IC0 is the only IC not working on PCB0, then all IC0s on the other PCBs are also not used. This gives the user assurance that they can load their design in any PCB in the emulator and it will function. In a third option that can be called "quad", the PCBs are grouped in groups of four. If a particular IC in the first PCB of one member of the quad is defective, the first PCB of each of the other quads will also be treated as if faulty and are not used. Thus if IC0 on PCB0 is not functioning, then IC0 on PCB4, PCB8, PCB12, and PCB16 are considered not working. This ensures that the user can download their design into any quad and it will function properly. Other fault avoidance techniques can be used depending on the design. Another example can be where there is a combination of faulty components on multiple PCBs. In such a case, the faults can be combined to create a combined fault list. For example, if IC0 on PCB0 is bad and IC1 on PCB1, the combined faults are that both IC) and IC1 can be considered faulty on all boards, even if those ICs are not necessarily faulty on the other boards.

Figure 4:
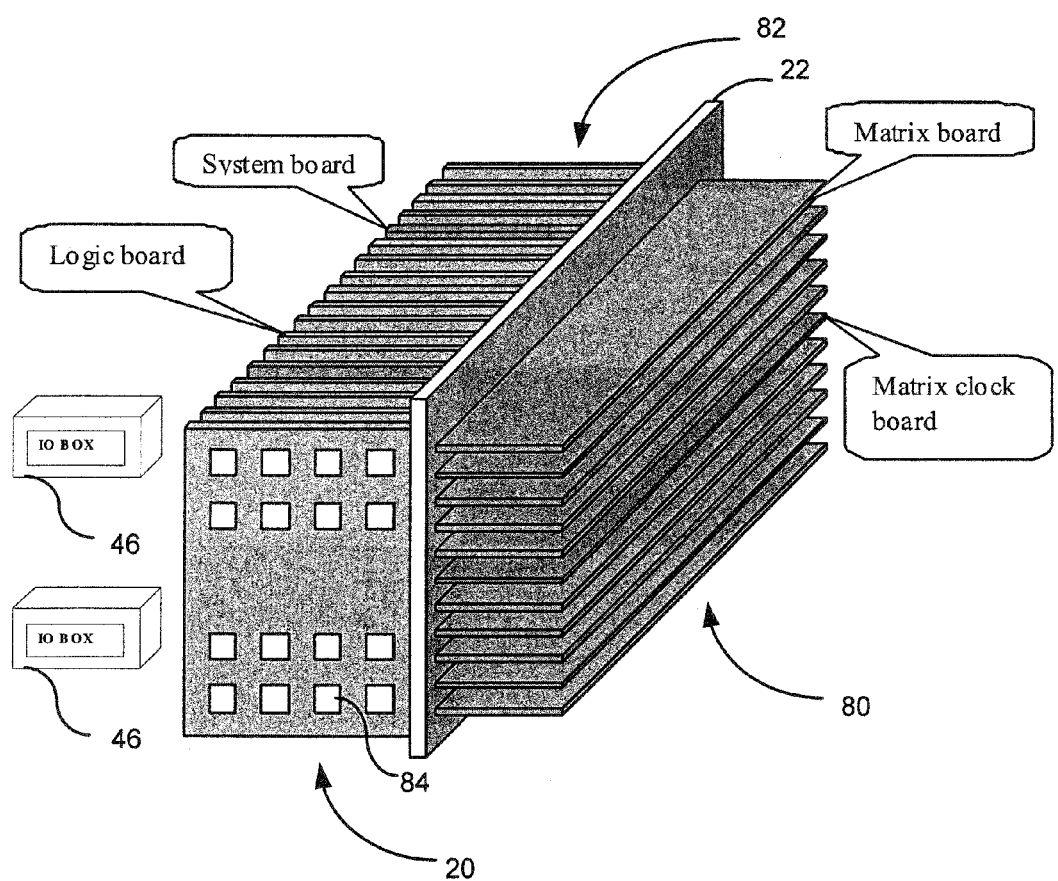
FIG. 4 is a three-dimensional physical view of an embodiment of a system of FIG. 1 including multiple printed circuit boards coupled together.

FIG. 4 shows a physical three-dimensional view of an embodiment of the emulator portion 18 including the midplane 22 having horizontal printed circuit boards 80 coupled to one side of the midplane, and vertical printed circuit boards 82 coupled to the opposite side of the midplane. The physical integrated circuits are shown at 84. The IO boxes 46 sit separately and are not generally considered part of the emulator. Other connection schemes can be used such as a motherboard or backplane.

Figure 5:
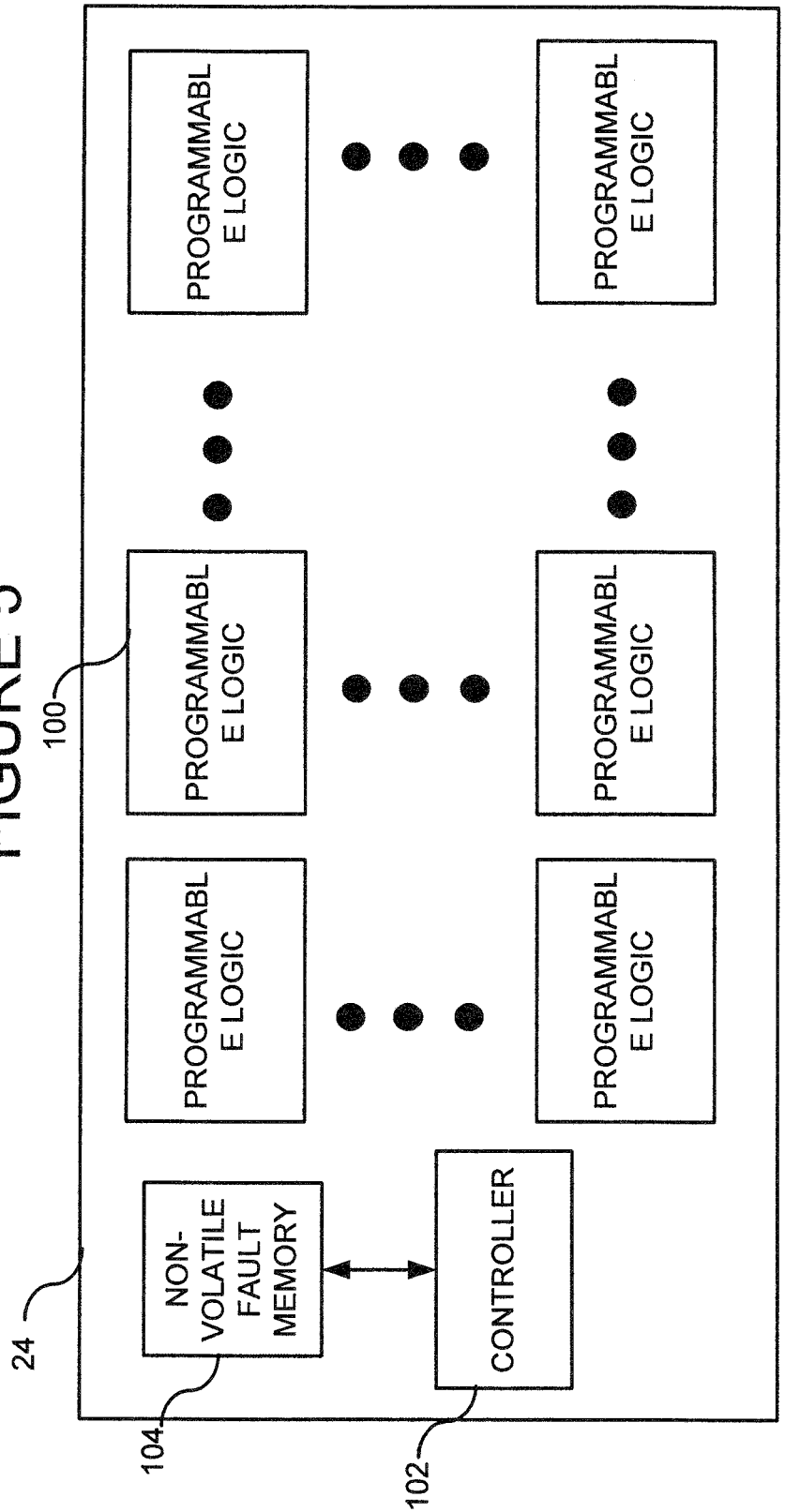
FIG. 5 is a detailed view of an exemplary emulator printed circuit board of FIG. 4.

FIG. 5 shows an embodiment of an exemplary emulator PCB 20 in more detail. For this particular example, the PCB is a programmable board 24, but other PCBs may have a similar or different structure. The illustrated PCB 24 includes multiple programmable ICs 100 (e.g., FPGAs) that are used to emulate the user's design. A controller 102 is coupled to the programmable ICs 100 and controls diagnostics, for example upon power up. Any programmable ICs or other resources on the PCB 24 that are malfunctioning are desirably stored locally on the emulator, such as stored in a non-volatile fault memory 104. The non-volatile memory may be flash memory or any other type of non-volatile memory. The faults of each PCB are therefore stored locally in the memory 104. The diagnostics may also be controlled by communication between the maintenance server 66 and the controller 102.

Figure 6:
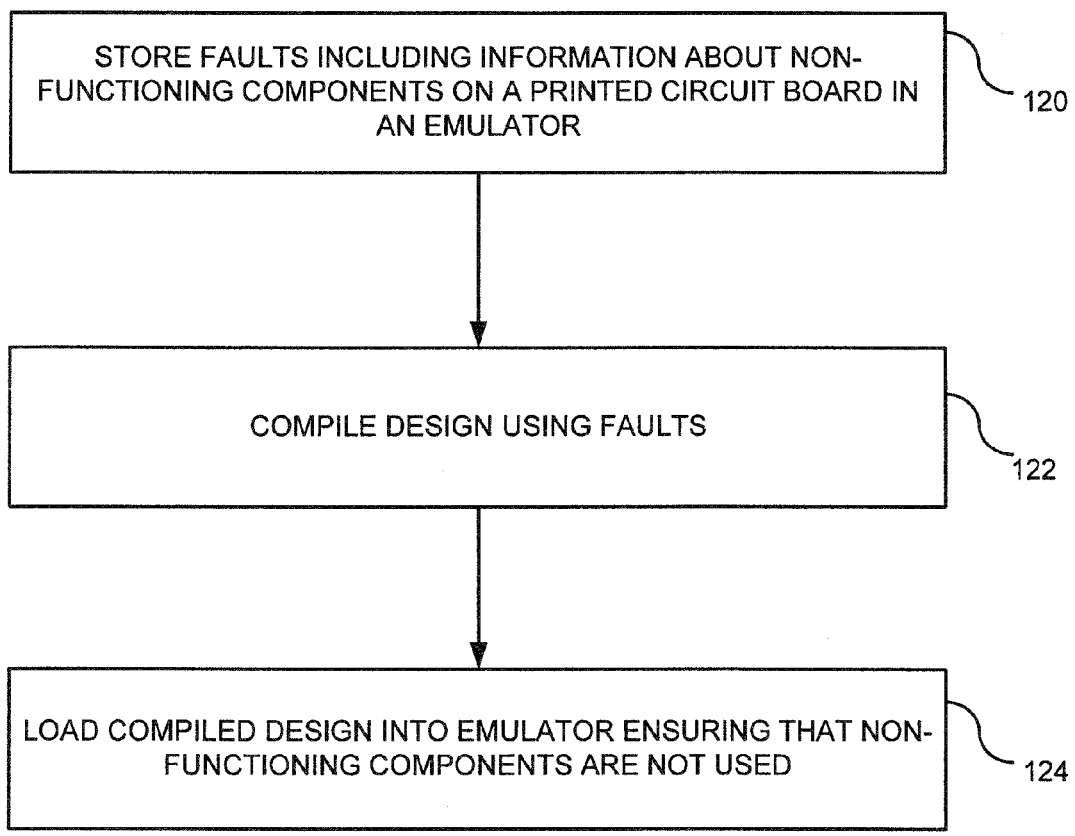
FIG. 6 is a flowchart of an embodiment of a method for using fault information in compiling a design to be emulated.

FIG. 6 is a flowchart of an embodiment of a method for compiling the design to be emulated using stored emulator faults, such as emulator faults stored locally, on each PCB. In process block 120, faults can be stored locally on the PCBs within the emulator. The faults indicate components (e.g., ICs) that are not functioning on that particular PCB. In process block 122, the user's design is compiled for emulation taking the faults into account during the compilation. Thus, the compiler uses only available, non-faulty resources on each PCB in order to compile the design. If IC0 on PCB0 is not functioning as indicated in the stored faults, then the compiler will compile the design and not use this particular IC. Desirably, ICs that are functioning and not listed in the faults list are used. In order to determine which components on the PCB are faulty, the faults stored in memory 104 can be read. In process block 124, the design can then be downloaded (i.e., programmed) into the emulator. However, an additional check can be performed. In particular, a check can be performed to ensure that the design being loaded does not use logic included in the fault list. To accomplish this, the resource server checks the faults stored in memory 104 before downloading the design. If the compiled design includes faults, an error is indicated on the workstation 14. On the other hand, if the compiled design is using only available, fault-free resources, then the design is programmed into the PCB for emulation.

Figure 7:
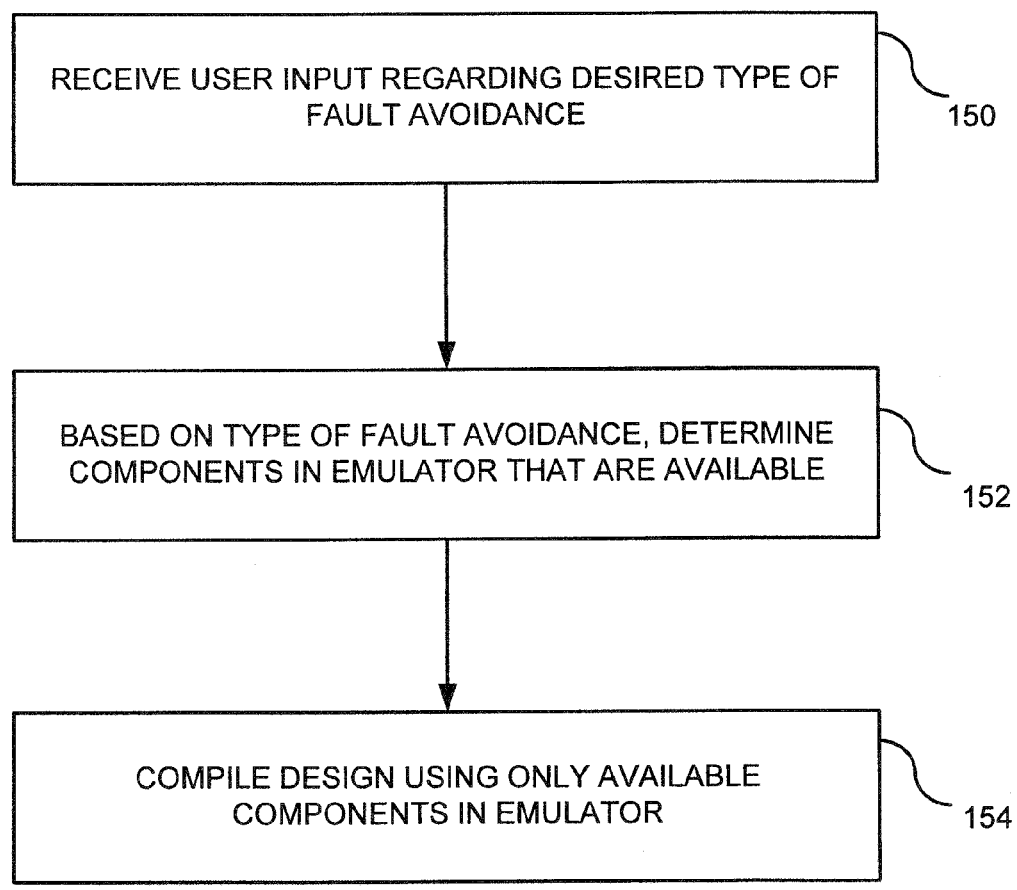
FIG. 7 is a flowchart of an embodiment of a method for using a fault avoidance technique in compiling a design to be emulated.

FIG. 7 is a flowchart of an embodiment of a method for using a fault avoidance type in the design compilation process. In process block 150, the user inputs into one of the workstations 14 the desired type of fault avoidance. By allowing the user to choose the fault avoidance type, the user maximizes flexibility by allowing the design to be downloaded into different printed circuit boards in the emulator. For example, the user can choose to compile the design such that a fault on one PCB does not affect available resources on other PCBs. For example, failure of IC0 on PCB0 can result in bypassing the use of IC0 on PCB0 without limiting the use of non-faulty ICs on other PCBs (e.g., IC0 on PCB1 is still used if not faulty.) Alternatively, the user can choose that faults on one PCB affect the use of resources on other PCBs. For example, a failure of IC0 on PCB0 can result in not using IC0 on PCB1 and IC0 on the other PCBs. In other words, the compiler will not consider IC0 on PCB0 or IC0 on PCB1 to be available resources, despite that IC0 on PCB1 is fully functioning. This allows the user to ensure that the design can be compiled and run on different PCBs in the system because faults are taken into account across PCBs. The user can also choose which boards or how many. For example, the user can choose that all PCBs are affected by a fault on any PCB. Alternatively, the user can choose that a smaller group of PCBs are affected by a fault on any PCB in that group (e.g., any board in a quad affects the same numbered board in another quad). In any event, faults on one PCB affect what are considered available resources on other PCBs in the emulator. In process block 152, based on the type of fault avoidance, a determination is made by the compiler as to which components in the emulator are available. Thus, the compiler considers the type of fault avoidance and if a fault occurs on an IC on one PCB, the compiler should determine the other PCBs in the system are affected by that fault, as already described above. In process block 154, the design is compiled using only the available components in the emulator as determined in process block 152.

Figure 8:
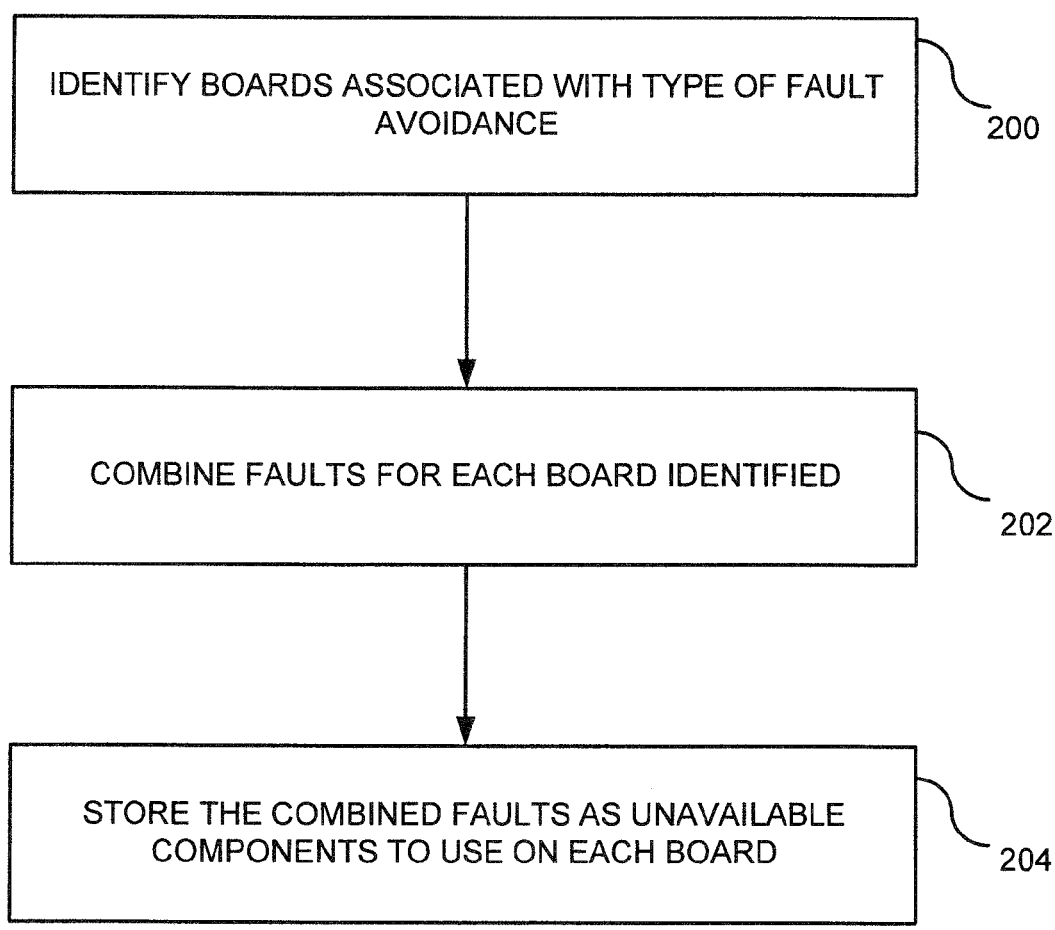
FIG. 8 is a flowchart of a method providing further details of an example that uses a fault avoidance technique of FIG. 7 in compiling a design to be emulated.

FIG. 8 is a flowchart of an embodiment of a method providing further details of process block 152 in FIG. 7. In process block 200, PCBs that are affected by the selected type of fault avoidance are identified. For example, if PCB1 has a fault and the fault avoidance type is quad, the similarly positioned board in each quad is also affected by the fault. In process block 202, the faults are effectively combined across each identified PCB. To combine the faults, the malfunctioning IC number can be used and applied to the same IC number on the other identified PCBs. Thus, other PCBs can be considered to have a fault at the same IC number as the faulty IC. In process block 204, the combined faults are stored to be used by the compiler in compiling the design. This ensures that the design can be emulated on different, but logically equivalent, PCBs within the emulator. If multiple emulators are used, faults may also be combined across emulators.

Figure 9:
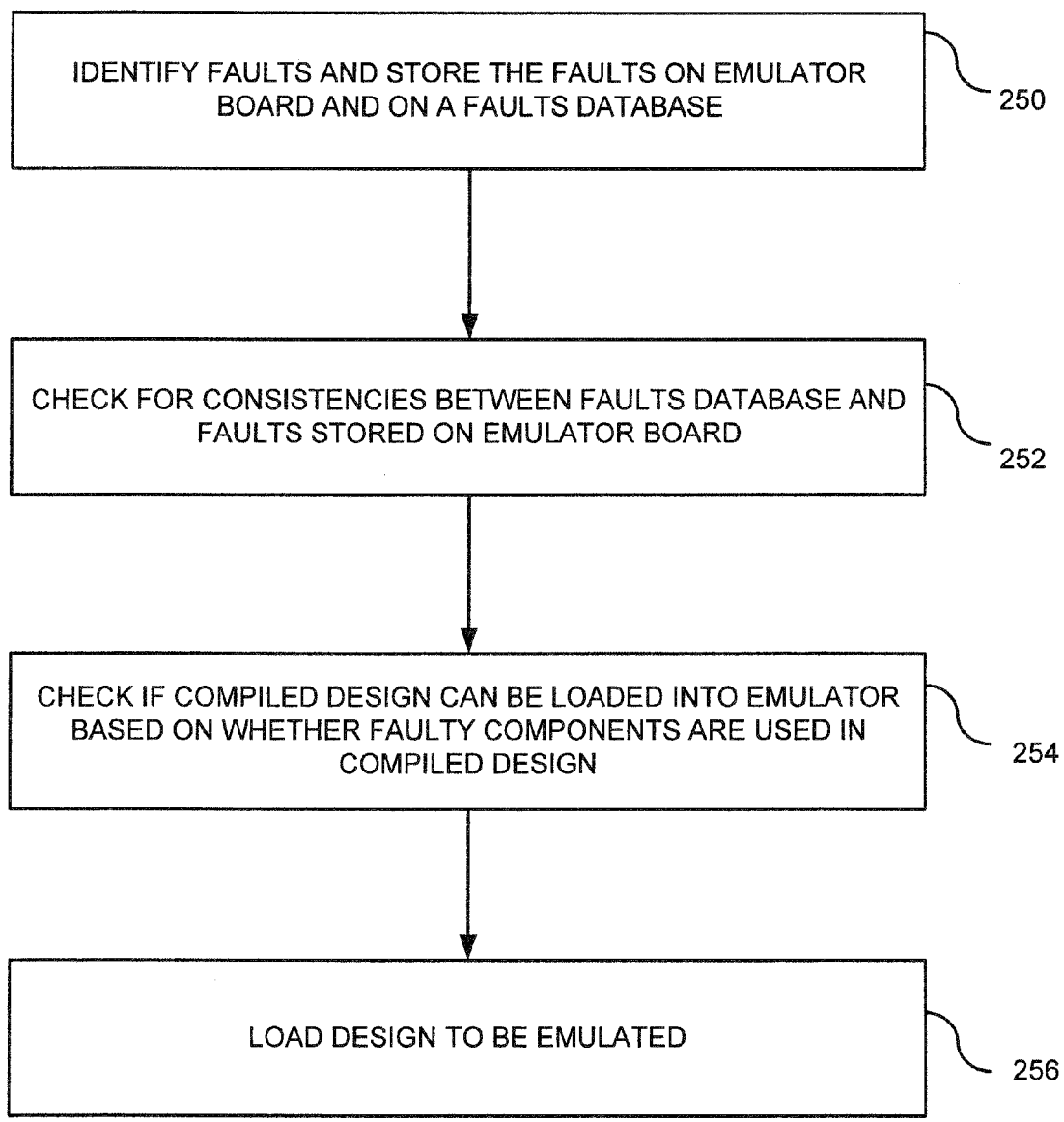
FIG. 9 is a flowchart of an embodiment of a method for checking if the design being loaded into the emulator is using fault-free resources.

FIG. 9 is a flowchart of an exemplary method for performing additional checks to ensure a compiled design is properly loaded into the emulator. In process block 250, faults are identified by running diagnostics on each PCB locally using the controller 102 in a well-known manner. The faults can be then stored on the emulator PCB itself, locally in memory. Additionally, it is desirable to store the faults in a faults database 72 so that if the emulator is powered down, the compiler can still access the fault information of all the PCBs. To accomplish this, the resource server 68 can read the locally stored faults and passes such faults to the faults database 72 through the virtual maintenance panel 67. In process block 252, a check can be made by the virtual maintenance panel 67 through the resource server 68 to see if the faults database 72 and the locally stored faults are consistent. If not, an error indication can be given to the user on workstation 14. The user can then instruct the resource server 68 to update the faults database either immediately or periodically. In process block 254, a check can be made by the resource server 68 if the compiled design being downloaded is using faulty components. Such a check can be accomplished by comparing ICs considered defective as stored locally in the memory 104 to ICs used in the compiled design. If the compiled design is using faulty components, an error is indicated to the user. In process block 256, the design is loaded into the emulator. Another check may also be performed if desired. Specifically, the resource server can check a board's serial number to ensure that boards have not swapped locations. If the faults database 72 stores information about an emulator board in a particular slot, checking the board's serial number ensures that the faults database properly informed the compiler 74 of faults on that board.

FIG. 10 is a flowchart of an embodiment of a method for storing fault information on the emulator boards. In process block 270, fault information is received through diagnostics on power-up and/or user input. For example, the user can input fault information that a known fault exists on a particular board through the virtual maintenance panel 67. The fault information is then stored in non-volatile memory on the emulator board associated with the fault information. In process block 272, after powering on the emulator, the virtual maintenance panel 67 receives fault information from the emulator boards. In process block 274, the virtual maintenance panel builds a database including the fault information. In addition, or alternatively, the virtual maintenance panel can generate a set of fault files used when compiling a design and used by the resource server prior to loading the design for a compatibility check.

In view of the many possible embodiments to which the principles of the disclosed invention may be applied, it should be recognized that the illustrated embodiments are only desirable examples of the invention and should not be taken as limiting the scope of the invention. Rather, the scope of the invention is defined by the following claims. We therefore claim as my invention all that comes within the scope of these claims.

We claim:

1. A computer-readable non-volatile storage having instructions thereon associated with loading a design into a hardware emulator, comprising:
    storing faults, associated with components on an emulator board, in a database external to the emulator board and in memory on the emulator board, the stored faults indicating defective components on the emulator board;
    compiling the design to be emulated by avoiding use of the components with the faults by accessing the stored faults in the database during compilation; and
    loading the design into the emulator, wherein through the compilation, the defective components on the emulator board are not used.

2. The computer-readable non-volatile storage of claim 1, further including comparing the faults stored in the database to the faults in the memory and issuing an indication if they are different.

3. The computer-readable non-volatile storage of claim 1, wherein the memory is non-volatile memory and wherein storing faults on the emulator board includes running diagnostics on the emulator board to determine components with faults and wherein storing includes storing results of the diagnostics in the non-volatile memory on the emulator board.

4. The computer-readable non-volatile storage of claim 1, further including combining faults associated with multiple emulator boards and compiling the design based on the combined faults.

5. The computer-readable non-volatile storage of claim 1, further including storing faults on the emulator board including running diagnostics on the emulator board and storing results of the diagnostics in a non-volatile memory on the emulator board and also storing the results in the database.

6. The computer-readable non-volatile storage of claim 5, further including comparing the faults stored in the database to the faults stored in the non-volatile memory and issuing an error indication if they are different.

7. The computer-readable non-volatile storage of claim 1, further including storing a board serial number on the emulator board and checking the emulator board serial number prior to the loading of the design.

8. An emulator for emulating a user design, comprising:
multiple printed circuit boards having programmable logic thereon for emulating the user design in hardware; and
at least one memory located external to the printed circuit boards in the emulator and at least one memory on the emulator board for stating faults, the stored faults indicating defective components on the emulator boards;
a compiler that uses the stored faults in the memory in order to compile the design such that the defective components on the emulator boards are not used;
wherein the user design is designed to be loaded into the multiple printed circuit boards for emulation such that the defective components are not used.

9. The emulator of claim 8, further including memory within the emulator for storing a fault avoidance type that indicates how the stored faults affect use of components on other of the printed circuit boards that do not have faults.

10. The emulator of claim 8, further including a resource server coupled to the multiple printed circuit boards and a database, the resource server coupled to retrieve the faults.

11. The emulator of claim 8, further including a resource server coupled to the multiple circuit boards, the resource server checking a serial number of a selected one of the printed circuit board prior to downloading a design to the selected printed circuit board to ensure that the design is loaded on a correct printed circuit board.

12. The emulator of claim 8, further including a compiler that uses a fault avoidance type received from a user and the stored faults to compile the user design.

13. A computer-readable non-volatile storage device for executing a method associated with faults in a hardware emulator, the method comprising:
storing faults external to an emulator board, the faults indicating defective components on the emulator board;
receiving user input regarding a fault avoidance type, the fault avoidance type indicating how the faults on the emulator board affect use of a set of components on other emulator boards that do not have faults;
storing the faults in memory on the emulator board and compiling the design, wherein compiling further includes reading the faults stored external to the emulator board or the faults stored in the memory on the emulator board; and
loading a design into the emulator such that the defective components are not used and the set of components on the other emulator boards are not used.

14. The computer-readable non-volatile storage device of claim 13, further including comparing the faults stored external to the emulator board to the faults stored in the memory on the emulator board and issuing an indication if they are different.

15. The computer-readable non-volatile storage device of claim 13, further including running diagnostics on the emulator board to determine defective components.

16. The computer-readable non-volatile storage device of claim 13, wherein loading the design includes programming programmable logic circuits in order to emulate the design.

17. A computer-readable non-volatile storage having instructions thereon associated with loading a design into a hardware emulator, comprising:
storing faults, associated with components on an emulator board, in a database external to the emulator board and in memory on the emulator board, the stored faults indicating defective components on the emulator board;
compiling the design to be emulated by avoiding use of the components with the faults by accessing the stored faults during compilation;
loading the design into the emulator, wherein through the compilation, the defective components on the emulator board are not used; and
storing faults on the emulator board including running diagnostics on the emulator board and storing results of the diagnostics in a non-volatile memory on the emulator board and also storing the results in the database.

18. The computer-readable non-volatile storage of claim 17, further including comparing the faults stored in the database to the faults stored in the non-volatile memory and issuing an error indication if they are different.

* * * * *